(No Model.)
B. T. BABBITT, Dec'd.
R. BABBITT, Executrix.
APPARATUS FOR THE MANUFACTURE OF GAS FOR HEATING AND ILLUMINATING PURPOSES.
No. 417,658. Patented Dec. 17, 1889.
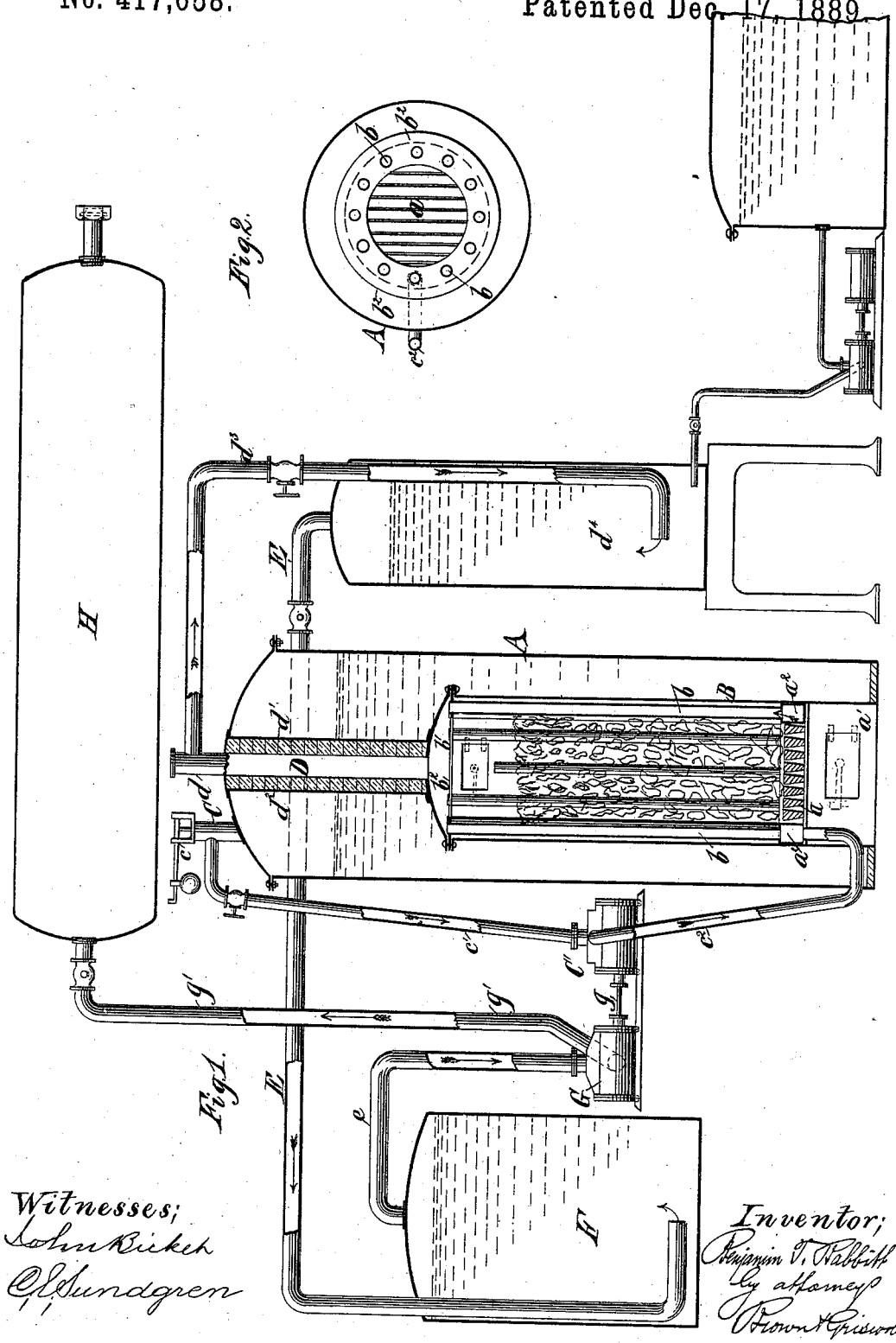
Witnesses;
John Bickel
C. F. Sundgren
Inventor;
Benjamin T. Babbitt
By attorneys
Brown & Griswold

UNITED STATES PATENT OFFICE.

BENJAMIN T. BABBITT, OF NEW YORK, N. Y.; REBECCA BABBITT EXECUTRIX OF SAID BENJAMIN T. BABBITT, DECEASED.

APPARATUS FOR THE MANUFACTURE OF GAS FOR HEATING AND ILLUMINATING PURPOSES.

SPECIFICATION forming part of Letters Patent No. 417,658, dated December 17, 1889.

Application filed March 23, 1889. Serial No. 304,510. (No model.)

*To all whom it may concern:*

Be it known that I, BENJAMIN T. BABBITT, of the city and county of New York, in the State of New York, have invented a new and useful Improvement in Apparatus for the Manufacture of Gas for Illuminating and Heating Purposes, of which the following is a specification, reference being had to the accompanying drawings.

My improvement relates to apparatus for the generation of gas for illuminating and heating purposes from solid carbonaceous matter and water.

In carrying out my improvement I provide a boiler in which is arranged a furnace. The steam from the boiler first operates a steam-engine. The furnace is filled or nearly filled with the solid carbonaceous matter from which carbonic-oxide gas is generated. The furnace is internally jacketed. The exhaust-steam after leaving the engine is caused to pass upwardly through the jacket to the upper portion of the furnace, where it commingles with the carbonic-oxide gas generated in the furnace, and the combined gas and steam in a highly-heated condition is conveyed away to a carburetor, where it is enriched. It is afterward purified, and is then compressed by a compressor operated by the engine and conveyed to a tank or reservoir, wherein it is contained under compression.

I will describe in detail gas apparatus embodying my improvement, and then point out the novel features in the claim.

In the accompanying drawings, Figure 1 is a view, partly diagrammatic and partly broken away, disclosing apparatus embodying my improvement. Fig. 2 is a horizontal sectional view taken on the plane of the line $x$ $x$, Fig. 1.

Similar letters of reference designate corresponding parts in all the figures.

A designates a boiler, here shown as cylindrical and vertically arranged. Within this boiler water is to be contained to any desired height. Arranged so as to extend upwardly for a considerable distance within the boiler is a furnace B, of which $a$ designates the fire-grate, and $a'$ the ash-pit. The fire-grate is, as shown, entirely inclosed by an annular passage $a^2$, into which steam is admitted in a manner presently to be described. Communicating with the passage $a^2$, and extending upwardly about the sides and within the furnace B, are a number of tubes $b$, which tubes constitute in effect a jacket; but any other suitable jacket may be employed. These tubes open at their upper ends into a chamber $b'$, said upper ends being maintained in position by an annular ring $b^2$, (shown more clearly in Fig. 2,) and which ring is secured at its outer edge portion to the boiler-shell. I have shown solid carbonaceous material as arranged in the center of the furnace and inward of the tubes $b$.

The carbonaceous material having been ignited near the bottom of the pile, carbonic-oxide gas will be generated from the upper portion of the mass and will ascend upwardly above the same. At the same time the water in the boiler A, having becoming heated, will give off steam, which steam passes upwardly through the upper portion of the boiler into a pipe C, controlled by a safety-valve $c$. From thence it passes to an engine C' through a pipe $c'$. Having done its work in operating the engine, (for purposes presently to be described,) it passes from the engine through a pipe $c^2$ into the annular passage $a^2$, surrounding the grate of the furnace. It then passes upwardly through the tubes $b$, issuing from the upper end of the latter, where it commingles, while still in the boiler, with the carbonic-oxide gas generated in the furnace. While in its passage through the tubes $b$ the steam becomes superheated. The mixed steam and gas then passes upwardly through a passage D, communicating with an exit-pipe $d$. The passage D is formed in a pipe or tube $d'$, secured to the upper portion of the boiler, and also to the upper portion of the furnace, and will preferably be lined with fire-brick or similar material $d^2$, in order to protect the pipe $d'$ from excessive heat. From the pipe $d$ the gas then passes through a pipe $d^3$ into the lower portion of a carburetor $d^4$, which carburetor may be filled with a liquid hydrocarbon or any other suitable enriching material. The gas passes upwardly through this enriching material and then outwardly into a pipe E, by which it is conveyed into the lower portion of a purifier F, containing any suitable purifying agent. From the purifier it passes through a pipe $e$ to a compressing-engine G. The compressing-engine G may be of any suitable kind, and is operated from the steam-engine C' through a piston-rod $g$.

H designates a reservoir for containing the gas, into which it is forced by the compressing-engine G through a pipe $g'$, and in which it is condensed and retained under pressure.

What I claim as my invention, and desire to secure by Letters Patent, is—

In an apparatus for generating gas, the combination, with a boiler, of a furnace extending upwardly within the same, a steam-jacket within said furnace, a steam-engine operated from said boiler, a communication between said steam-engine and the said jacket, by which the exhaust-steam from the engine is conveyed to the jacket, a chamber in the furnace into which said steam after having been superheated in said jacket is received and wherein it commingles with carbonic oxide generated in the furnace, a carburetor into which gas is received from the furnace, a purifier, a compressor, and a reservoir or tank for the compressed gas, substantially as specified.

BENJAMIN T. BABBITT.

Witnesses:
FREDK. HAYNES,
ARTHUR H. GAMBLIN.